United States Patent [19]

Hau et al.

[11] Patent Number: 5,703,917
[45] Date of Patent: Dec. 30, 1997

[54] CLOSING DEVICE FOR INITIATING COOLING FOR A CORE MELT

[75] Inventors: Gerhard Hau, Albstadt; Lothar Wistuba, Herzogenaurach; Josef Hollmann, Schlüsselfeld, all of Germany

[73] Assignee: Siemens Aktiengesellschaft, Munich, Germany

[21] Appl. No.: 569,677

[22] Filed: Dec. 8, 1995

Related U.S. Application Data

[63] Continuation of PCT/DE94/00619, Jun. 1, 1994.

[30] Foreign Application Priority Data

Jun. 8, 1993 [DE] Germany .................. P 43 19 092.8
Nov. 2, 1993 [DE] Germany .................. P 43 37 367.4

[51] Int. Cl.⁶ .................................................. G21C 9/016
[52] U.S. Cl. ........................................ 376/280; 376/284
[58] Field of Search ............................ 376/280, 284; 976/DIG. 143

[56] References Cited

U.S. PATENT DOCUMENTS

| | | | |
|---|---|---|---|
| 2,723,722 | 11/1955 | Hicks | 169/26 |
| 4,442,065 | 4/1984 | Latter et al. | 376/280 |
| 5,080,857 | 1/1992 | Miller et al. | 376/280 |
| 5,410,577 | 4/1995 | Forsberg et al. | 376/280 |

FOREIGN PATENT DOCUMENTS

| | | |
|---|---|---|
| 0 390 486 | 10/1990 | European Pat. Off. . |
| 0 419 159 | 1/1992 | European Pat. Off. . |
| 1013130 | 7/1952 | France . |
| 2135574 | 12/1972 | France . |
| 40 32 736 | 4/1992 | Germany . |
| 40 41 295 | 7/1992 | Germany . |
| 42 37 245 | 5/1993 | Germany . |
| 42 06 660 | 9/1993 | Germany . |
| 2 115 905 | 9/1983 | United Kingdom . |

OTHER PUBLICATIONS

Japanese Patent Abstract No. JP 60-066 800, (Apr. 1985).

*Primary Examiner*—Daniel D. Wasil
*Attorney, Agent, or Firm*—Herbert L. Lerner; Laurence A. Greenberg

[57] ABSTRACT

A nuclear reactor facility has a collecting chamber for a core melt, a coolant tank and a coolant connecting line having an inlet end connected to the coolant tank and an outlet end protruding into the collecting chamber and having an outlet cross section. A closing device at the connecting line which opens as a function of temperature for initiating cooling of the core melt includes a closing member disposed at the outlet end of the connecting line for normally tightly closing the outlet end. The closing member has a temperature-dependent opening element for tripping clearance of at least a portion of the outlet cross section of the connecting line upon thermal action by the core melt to direct the coolant from the coolant tank, through the connecting line and into the collecting chamber. The opening element being a plastic block which thermally insulates the coolant, and is corrosion-resistant.

5 Claims, 12 Drawing Sheets

CLOSING DEVICE FOR INITIATING COOLING FOR A CORE MELT

CROSS-REFERENCE TO RELATED APPLICATION

This application is a Continuation of International Application PCT/DE 94/00619, filed Jun. 1, 1994.

BACKGROUND OF THE INVENTION

Field of the Invention

The invention relates to a closing device that opens as a function of temperature at a coolant connecting line, for initiating cooling of a core melt or reactor-meltdown products in a nuclear reactor facility.

In German Published, Non-Prosecuted Patent Application DE 40 41 295 A1, corresponding to U.S. Pat. No. 5,343,506, (see in particular FIG. 2), a core retention device (also known as a core catcher) for a nuclear reactor system is described that operates by the crucible concept. In other words, in the highly unlikely instance of a core meltdown, the core melt is caught in a steel crucible, which is disposed below the reactor pressure vessel and is water-cooled on its bottom and on its sides. The crucible is preferably lined on its inside with a protective jacket of high-temperature-proof metal oxides (such as MgO, $UO_2$ or $ThO_2$). The protective jacket is followed with a deposit of sacrificial material as a second protective layer for the crucible, which is constructed in particular as masonry made of shielding concrete stones. The crucible or collecting container is pierced in the upper half of its jacket wall portion by at least one melting cooling tube, which on its inner (outlet-side) end is sealed off through the use of a fusible plug and is connected on its inlet side to a coolant tank, so that when core melt is present in the collecting container, the fusible plug is heated to its melting temperature and made to melt, thereby clearing a flow path for the coolant to the surface of the core melt. If the fusible plug is to melt, it must be kept dry. In other words, the cooling water must, if at all possible, not yet have been allowed to reach the fusible plug during the melting process.

In U.S. Pat. No. 5,080,857, an apparatus for cooling core melt is described that has a water supply and a pipeline which connects the water supply with the interior of a reactor cavern. The supply line is closed off during normal reactor operation by a plug made of a fusible metal or is sealed off by a plate with a sealing ring. The plate is permanently connected to a flange of the supply line by a bolt made of a fusible metal. In that patent, the term fusible metal is understood solely to mean a metal that has a melting temperature below 400° C. As an example of such a metal, reference is made to a solder metal having a melting point which is correspondingly low. In order to protect the fusible metal against corrosion, the patent discloses sheathing the fusible metal with a plastic cap, which melts at a lower temperature than the melting temperature of the fusible metal and does not hinder opening of the apparatus for cooling. Moreover, with the fusible metals mentioned in that patent, the possibility exists that they may give off toxic components, such as lead, under the influence of heat. The extent to which such a fusible metal assures a secure closure of the apparatus over a relatively long period of time, when exposed to an elevated temperature and possibly radiation, cannot be learned from the patent.

SUMMARY OF THE INVENTION

It is accordingly an object of the invention to provide a closing device for initiating cooling for a core melt, which overcomes the hereinafore-mentioned disadvantages of the heretofore-known devices of this general type, which has an inherently safe response, which opens as a function of temperature, and in which a closing member remains closed with long-term resistance, especially under operating conditions of a nuclear reactor, and then opens reliably under the influence of a melting heat even if coolant in general and cooling water in particular extends as far as an outlet end of the connecting line, or in other words exposes that end to a cooling action. The invention is intended to be used preferentially with core retention devices or core catchers that operate by the expansion principle. However, it should also be universally usable with other types of core retention devices, such as those operating by the crucible concept.

With the foregoing and other objects in view there is provided, in accordance with the invention, a closing device being disposed at a connecting line and opening as a function of temperature for initiating cooling of a core melt in a nuclear reactor facility, comprising a collecting chamber for the core melt, a coolant tank, an inlet end of the coolant connecting line being connected to the coolant tank, an outlet end of the coolant connecting line protruding into the collecting chamber and having an outlet cross section, and a closing member disposed at the outlet end of the connecting line for normally tightly closing the outlet end, the closing member having a temperature-dependent opening element for tripping clearance of at least a portion of the outlet cross section of the connecting line upon thermal action by the core melt to direct the coolant from the coolant tank, through the connecting line and into the collecting chamber, the opening element being thermally insulated from the coolant, and the opening element being largely corrosion-resistant.

The cold insulation may be provided in the form of sealing elements made of plastic, for instance, or insulating air cushion chambers, or cold restrictors, to name only a few examples.

The advantages attainable with the invention are considered above all to be that a closing member which is protected with regard to cold flow cannot be impaired in its safety function by the coolant, in particular the cooling water. The coolant is capable of wetting the inside of the closing member and, in the case of an EPR (European pressurized water reactor), is part of the IRWST (in-containment refueling water storage tank). In other words, it can be present as far as the outlet end of the connecting line and if, in the highly unlikely malfunction scenario, the core melt pours into the collecting chamber (the core melt height being initially low), then a sealing element of the closing member, for instance, melts open from the thermal action, and the water from the connecting line is immediately available for covering the surface of the core melt. The corrosion resistance of the opening element moreover contributes to the prevention of an unintended opening of the closing member even over a long period of time. The opening element and the closing member can both preferably be constructed to be radiation-resistant for long periods. Given the stringent safety requirements made of a nuclear reactor, an inherently corrosion-resistant and radiation-resistant opening element is especially advantageous, because then no further provisions for corrosion protection are unnecessary.

Although the invention is not limited to cooling water as a coolant, nevertheless cooling water is the preferred coolant used in core melt cooling. The coolant, especially in the case of cooling a core melt, may also be a neutron-absorbing, non-combustible liquid, such as a mixture of water and boric acid.

In accordance with another feature of the invention, the closing member has a plastic block as a sealing element, which is held sealingly by a sealing flange against a pipe flange on the outlet-side end of the connecting line. This plastic block preferably is formed of a thermoplastic material, such as polypropylene or polyethylene. The thermal insulation of such a plastic block is especially effective.

In accordance with a further feature of the invention, the the closing member has a meltable plastic plate as its sealing element, which can be fastened sealingly against a sealing surface in the peripheral orifice region of the connecting line. The requisite thermal insulation action can be adjusted by the dimensions of the wall thickness of the plastic plate.

In accordance with an added feature of the invention, the closing member has a meltable plastic tube which is closed on its free end and is sealingly flanged to the outlet end of the connecting line. In this embodiment, it is possible to extend the plastic tube parallel to the bottom or floor of the collecting chamber, so that it necessarily is melted open by the core melt even if the height of the core is low and even if the chamber contains cooling water.

In accordance with an additional feature of the invention, the connecting line and the plastic tube flanged to it are each formed as a respective tube elbow, with a tube bend extending downward and upward, respectively, from the horizontal, thus forming an approximately S-shaped line end portion, with a plastic tube part coming to an end approximately horizontally in the collecting chamber.

In accordance with yet another feature of the invention, the closing member has a sealing configuration as its opening mechanism that has a rated breaking performance and that includes a sealing element and an associated retainer; upon thermal action by the core melt, as a result of tearing, bursting or some other kind of destruction of the sealing configuration, the sealing configuration clears at least a portion of the outlet cross section of the connecting line, so that the coolant can be carried from the coolant tank to the surface of the core melt through the connecting line. The sealing element may be a bursting disk or a bursting diaphragm. A glass plate may be used as the bursting disk, which already brings about adequate cold insulation. A metal bursting diaphragm may also be used in which case it is expedient to construct a chamber upstream of the metal bursting diaphragm in the closing member as a steam pressure chamber, which assures the requisite cold insulation.

In accordance with yet a further feature of the invention, the sealing configuration of the closing member or its temperature-dependent opening mechanism can also have an expansion bolt fastener; an expansion bolt of the fastener has a bolt breaking point formed by cross-sectional reduction, which breaks at a limit value of a temperature-dictated expansion bolt elongation and uncovers the sealing flap for the opening. Instead of an expansion bolt, a corrosion-resistant fusible bolt which has an adequate spacing from the column of coolant in the connecting line can also be used. The fusible bolt has a melting temperature above 500° C., and in particular above 700° C. Preferably, it has a high proportion of silver, over 50%. Moreover, besides silver, the fusible bolt can contain palladium, for instance from 5% to 25%, and copper, for instance from 0% to approximately 35%, and has a melting temperature above 800° C.

In accordance with yet an added feature of the invention, there is provided a glass plate that is fastened in place by a rubber cuff seal and is sealingly braced in supporting and at the same time cold-insulating relation by a thermal bursting disk, so that upon destruction of the thermal bursting disk from the melting heat, the unsupported glass plate can be destroyed by the static water pressure at the outlet end of the connecting line.

In accordance with yet an additional feature of the invention, cold-decoupling of the opening mechanism of the closing member can also be accomplished by providing that the expansion element of the closing member is retained in its closing position through the use of stored auxiliary energy and can be put into its opening position by discharge or dissipation of the auxiliary energy, tripped by the thermal action of the melt.

In accordance with again another feature of the invention, a favorable cold insulation can be attained by providing a hood-like closing member being disposed on the outlet end of the connecting line and being divided into an outer hood part and an inner hood part through the use of at least one surrounding fusible solder connection of a corrosion-resistant silver solder; when the fusible solder connection melts open as a result of thermal action by the core melt, the outer hood part drops off and clears the outlet cross section of the outlet end of the connecting line.

In accordance with again a further feature of the invention, in order to ensure that the fusible solder connection will melt as fast as possible on the occurrence of a core meltdown, an annular gap is expediently provided between the hood-like closing member and the extension of the connecting line; in the region of the fusible solder connection the gap is filled with an air cushion that keeps the water column away from the fusible solder connection.

In accordance with a concomitant feature of the invention, the core melt heat and the radiation that act on the fusible solder connection are reinforced by a shield-like thermal radiation reflector, which surrounds the hood-like closing member and has a focal point zone in which the fusible solder connection is located. Corrosion-resistant silver solder is understood to mean a fusible solder which has silver in a proportion of over 50% and a liquidus temperature of over 600° C. The silver solder preferably has a proportion of palladium and optionally also of copper. By way of example, it can be formed of 58% Ag, 32% Cu and 10% Pd, with a liquidus temperature of about 850° C. A different composition of the fusible solder, as was described earlier herein, is also possible. Other largely corrosion-resistant fusible solders with liquidus temperatures above 600° C. may also be used.

Other features which are considered as characteristic for the invention are set forth in the appended claims.

Although the invention is illustrated and described herein as embodied in a closing device for initiating cooling for a core melt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
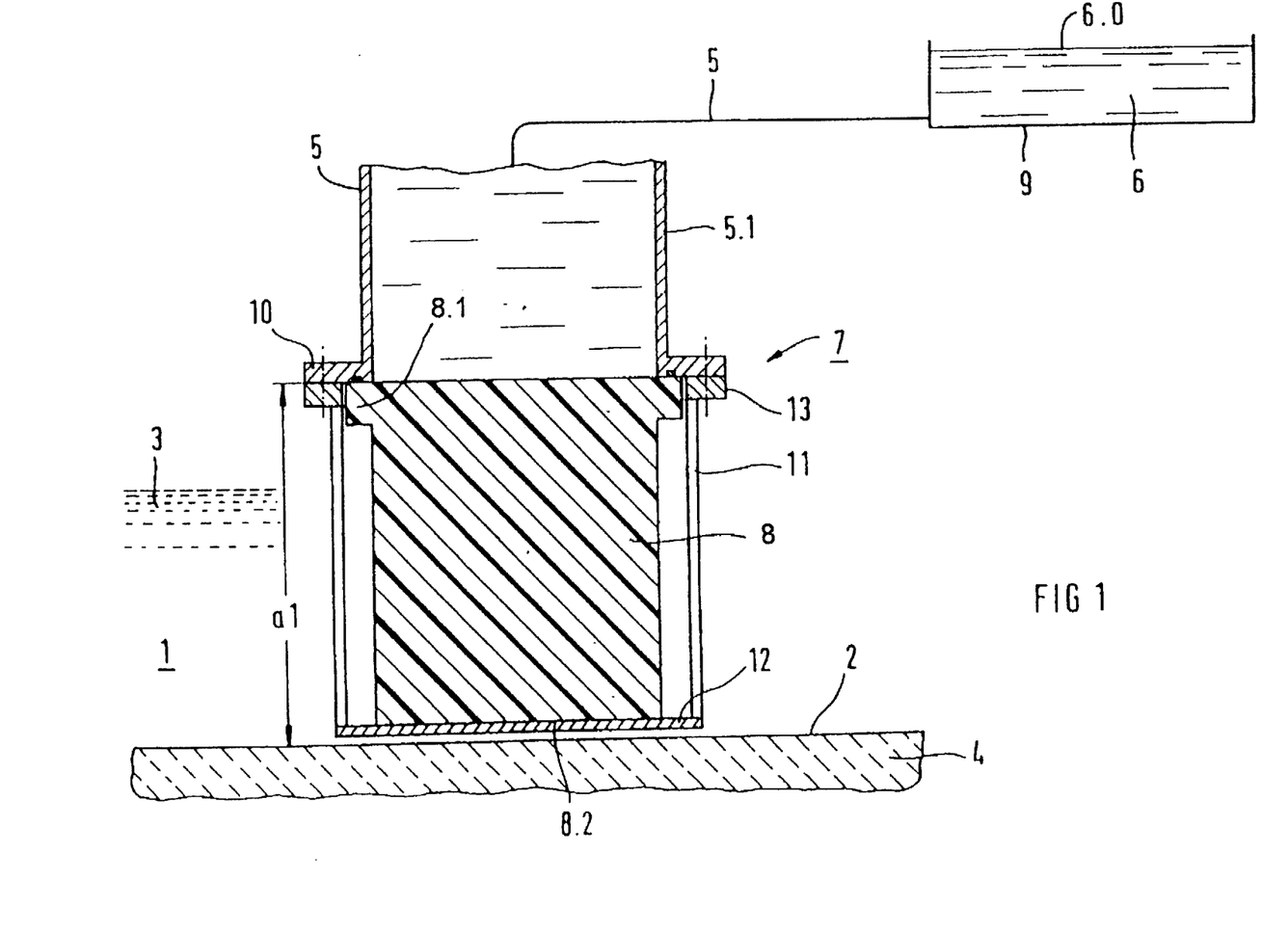
FIG. 1 is a fragmentary, diagrammatic, longitudinal-sectional view of a first exemplary embodiment an outlet end of a connecting line, with a plastic block of a sealing element of a closing member and an adjacent expansion surface of a collecting chamber for a core melt.

Referring now to the Figures of the drawing in detail and first, particularly, to FIG. 1 thereof, there is seen a collecting chamber 1 for a core melt or reactor-meltdown products 3 of a pressurized water nuclear reactor system, having a core retention device or core catcher that operates by the expansion principle. To that end, the collecting chamber 1 has an expansion surface 2 on the bottom, which can sweep an area of 150 m$^2$, for instance, for a 1300 MW$_{el}$ nuclear reactor, so that the core melt, which is diagrammatically suggested at reference numeral 3, can expand over a large area with a relatively low melt height. The expansion surface 2 is formed by a concrete structure 4. The uppermost layer of this concrete structure 4 can be formed of so-called sacrificial concrete, which is a concrete that bonds with the core melt and in particular acts to lower its melting point, making the core melt less viscous. Zirconium oxide stones in the form of masonry may also be disposed below the concrete structure 4 and on non-illustrated lateral surfaces or sides, and the actual non-illustrated concrete structure is then located beneath this masonry.

A connecting line 5 for cooling water or coolant 6, which has a vertically oriented outlet end 5.1, serves to initiate cooling for the core melt 3. The connecting line 5 protrudes with its outlet end 5.1 into the collecting chamber 1 and terminates at a vertical spacing al from the expansion surface 2. A diagrammatically illustrated inlet end of the connecting line 5 is connected to a cooling water tank or reservoir 9, which is shown diagrammatically smaller than scale. In particular, this tank is a so-called IRWST (in-containment refueling water storage tank) of a pressurized water reactor. This coolant tank may, for instance, have a coolant volume of 1500 m$^3$ or more. A coolant level 6.0 is far above the outlet end 5.1, so that in the cooling instance sufficient quantities of water can flow out of the outlet end 5.1 onto the core melt 3. A closing member for the connecting line 5, which is identified overall by reference numeral 7, is disposed on the outlet end 5.1 of the connecting line 5, with a non-metallic sealing element 8 in the form of a plastic block. The sealing element 8 normally sealingly closes the outlet end 5.1 and can be melted open upon thermal action of the core melt 3, clearing at least a portion of the outlet cross section of the connecting line 5, so that the coolant 6 can be carried out of the cooling water tank 9 to the surface of the core melt 3.

The sealing element 8 is constructed as a solid, cylindrical plastic block, in adaptation to the hollow-cylindrical tube cross section of the connecting line 5. This block is sealingly held by a sealing flange 8.1 against a pipe flange 10 on the outlet end 5.1 of the connecting line 5. In order to retain the sealing element or plastic block 8 in its sealing position, a tension element 11 is anchored in the pipe flange 10. This tension element 11 engages a pressure device 12, which in turn engages an end surface 8.2 in the direction toward the sealing flange 8.1 of the sealing element 8. The tension element 11 is constructed as a steel frame or case or in other words as a hollow cylinder of steel, which is permanently connected on its upper end to a flange ring 13, for instance by welding. Through the use of this flange ring 13, the tension element 11 is fastened to the pipe flange 10 of the connecting line 5, as shown. In the fastening process, the requisite fastening forces are exerted upon the sealing element through the pressure device 12, so that the sealing element is pressed firmly and tightly against the pipe flange 10. The connection between the tension element 11 (steel box) and the pressure device 12 (constructed in particular as a plate) is also carried out by welding. Instead of the steel box 11, a plurality of tie rods could also be distributed over the periphery of the sealing element 8. The tie rods would then be joined tightenably with the pressure device 12 and the pipe flange 10.

If the tension element or steel box 11 is reached by the expanding core melt 3, it is melted open, and the fastening for the sealing element 8 is destroyed. The sealing element is flushed away by the core melt 3 and at the same time melted in the process, clearing the way for the coolant 6. The spacing between the pipe flange 10 and expansion surface 2, which is identified by reference symbol a1, is greater than the maximum height of the core melt 3, so that in any case coolant can always flow to the surface of the core melt.

Figure 2:
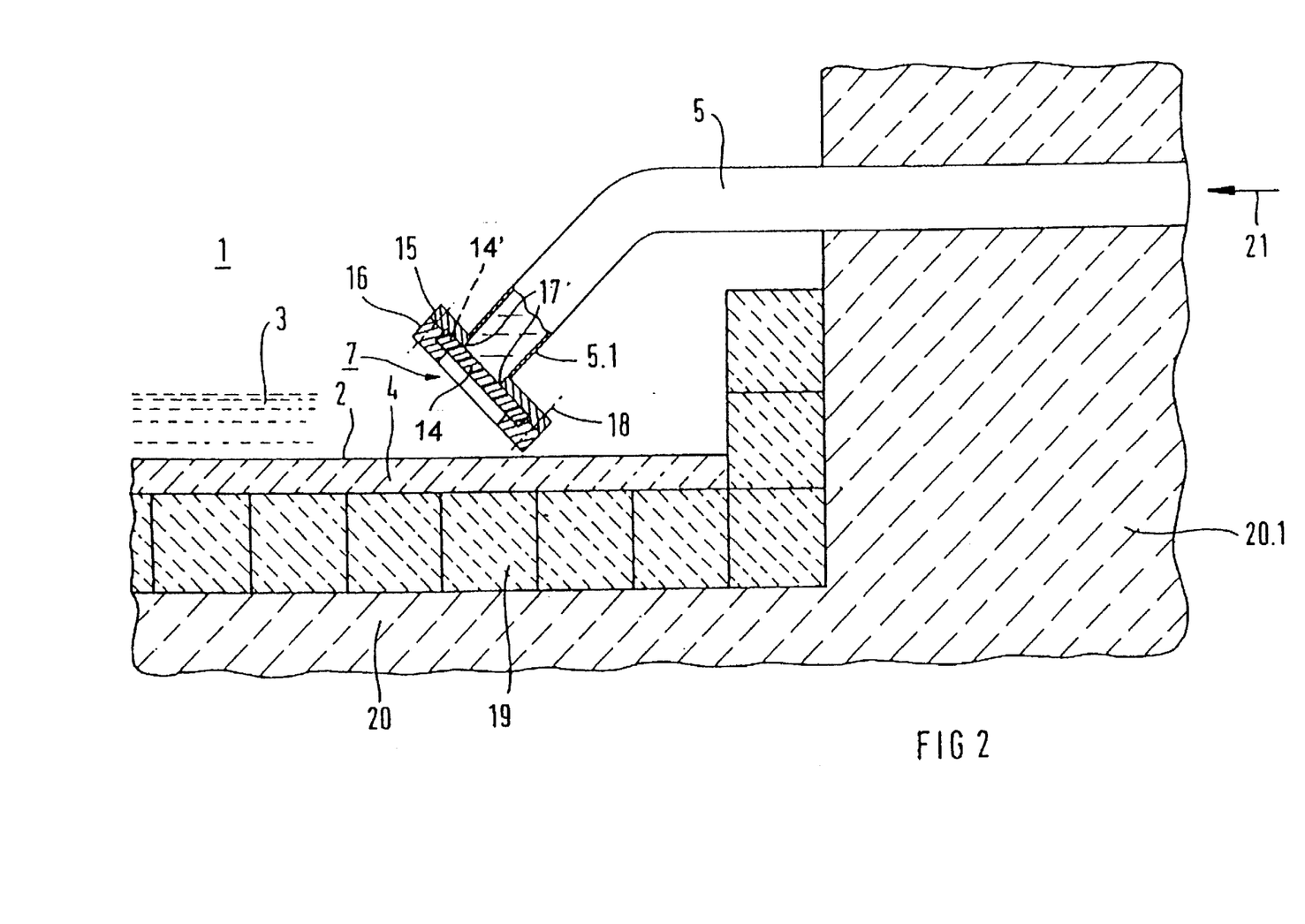
FIG. 2 is a fragmentary, longitudinal-sectional view of a second exemplary embodiment with a closing member which may have a glass or plastic plate as its sealing element on the outlet end of the connecting tube, which is passed from a non-illustrated coolant tank through a concrete wall and ends with its closing member just above a bottom of the collecting chamber for the core melt.

In the second exemplary embodiment of FIG. 2, a connecting line 5 which is bent obliquely downward on its outlet end 5.1 has an orifice end that is closed off by a plastic plate 14 acting as a sealing element. To that end, the outlet end 5.1 of the connecting line 5 is provided with a pipe flange 15, and the sealing element 14 is surrounded and engaged in its peripheral region by a counterflange 16. The sealing element 14 is pressed sealingly against a sealing surface 17 by the counterflange 16 which can be fastened to the pipe flange 15. Flange screws are suggested at reference numeral 18. The connecting line 5 is preferably a hollow-cylindrical pipeline, so that the sealing element 14 takes the form of a plastic disk or circular plate. According to another advantageous embodiment, the sealing element 14 is a glass bursting disk 14'.

The sacrificial concrete 4 is lined on the back with $ZrO_2$ stones 19, which have a neutron-absorbing action. Located below or laterally of the zirconium oxide stones 19 is a concrete structure 20 of a building, with a wall structure 20.1 that divides the collecting chamber 1 from the cooling water tank. The connecting line 5 is passed through this wall structure 20.1. An arrow 21 indicates the flow direction of the coolant. Once the expansion core melt 3 reaches the sealing element 14 in the form of the plastic plate, this sealing element is melted open, and the coolant passes from the cooling water tank or IRWST into the collecting chamber 1 through the connecting line 5. The process takes a different course, if a glass bursting disk 14', as a sealing element 14, bursts on exposure to the core melt heat.

Figure 3:
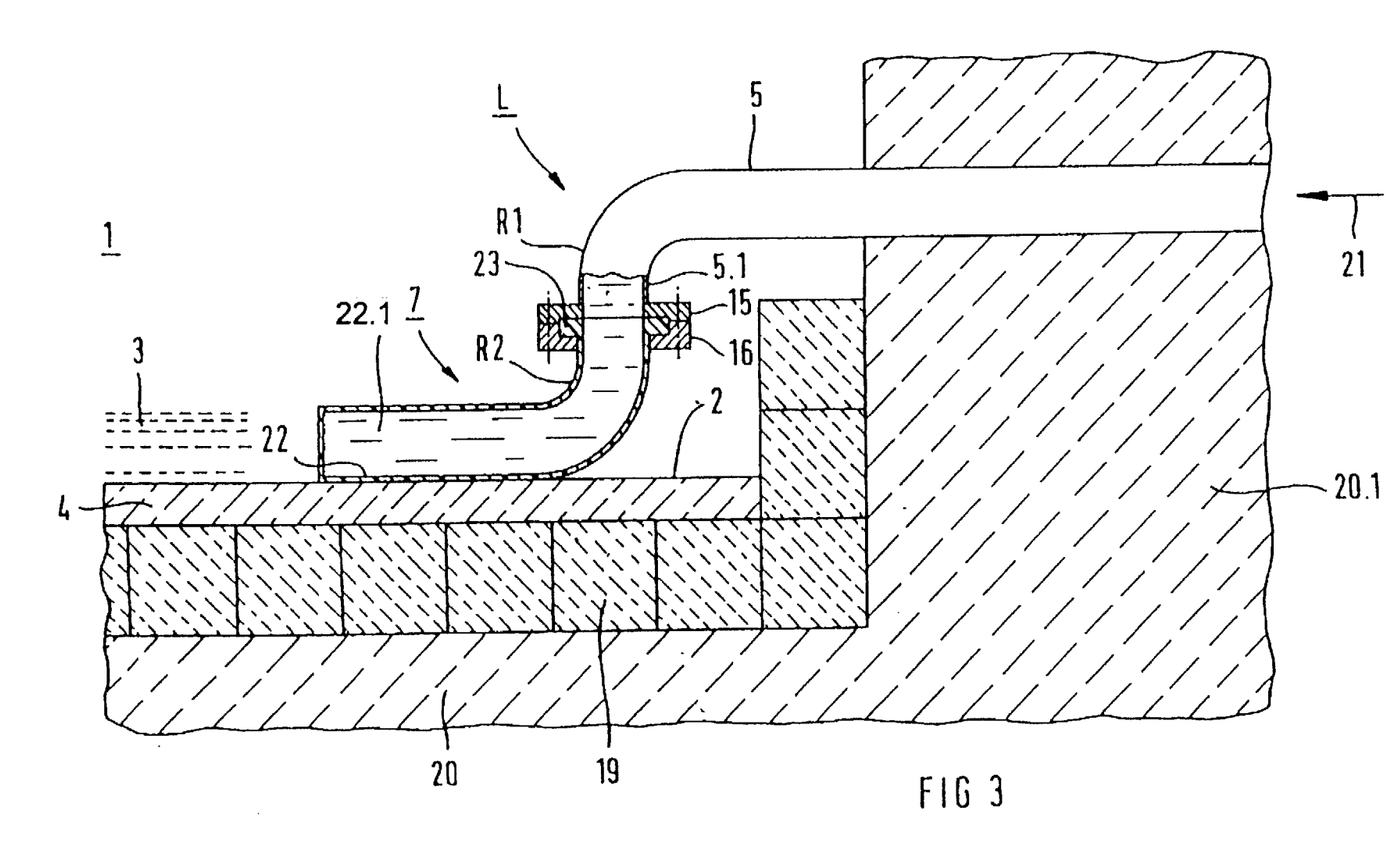
FIG. 3 is a view similar to FIGS. 1 and 2 of a further variant of the closing member, with a plastic tube on the outlet end of the connecting line and with the tube being laid parallel to the bottom of the collecting chamber.

In the third exemplary embodiment of FIG. 3, a meltable plastic tube 22 which is closed on its free end is sealingly flanged to the outlet end 5.1 of the connecting line 5. The connecting line 5 and the plastic tube 22 that is flanged to it are preferably each formed as a respective tube elbow, with respective tube bends R1 and R2 extending downward and upward, respectively, from the horizontal, thus forming an approximately S-shaped line end portion L. By virtue of this structure, the plastic tube part 22 comes to an end approximately horizontally in the collecting chamber 1. The pipe flange is again identified by reference numeral 15, and the counterflange that fits over the plastic tube 22 and sealingly presses an annular flange 23 of the plastic tube part 22 against the pipe flange 15, is identified by reference numeral 16. The plastic tube 22 is destroyed at a horizontal leg 22.1 thereof extending parallel to the expansion surface 2 when it is reached by the expanding core melt 3, so that the orifice for the coolant is located in the region of the flange configuration 15, 16, 23, and it is thus assured that the coolant will wet the surface of the core melt 3.

Figure 4:
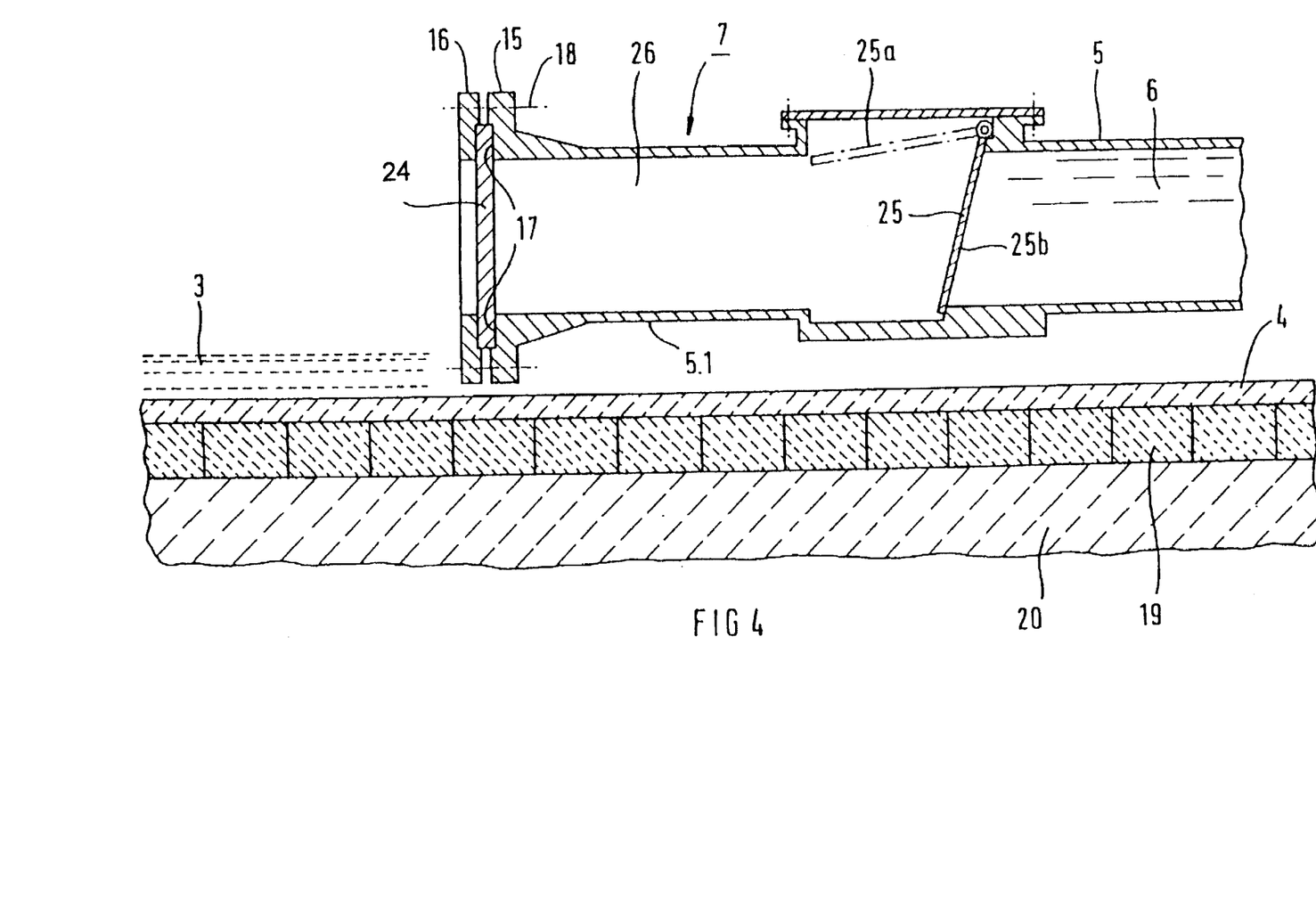
FIG. 4 is a view similar to FIGS. 1 and 2 of a closing device having a metal bursting diaphragm on the outlet end of the connecting line, wherein a steam pressure chamber precedes the bursting diaphragm and a check flap divides the steam pressure chamber from the water column.

A closing device having a sealing element 14 with a rated breaking performance, in the form of a glass plate or a glass disk, has already been described in conjunction with FIG. 2. FIGS. 4–7 shows exemplary embodiments of other closing devices, all of which have a sealing configuration with a rated breaking performance. In FIG. 4, the closing member 7 of the connecting line 5 has a metal bursting diaphragm 24 as its sealing element, which is sealingly fastened in place between a pipe flange 15 and a counterflange 16. A steam pressure chamber 26 is provided between the bursting diaphragm 24 and a check flap 25 disposed at a farther upstream location of the connecting line 5. The cooling water which is used as a coolant evaporates in the steam pressure chamber 26 under the influence of heat from an expanding core melt 3, and as a result the check flap 25, which is in its illustrated position of repose corresponding to a closing position 25b, is pressed against its seat by steam pressure forces.

The resultant steam pressure in the steam pressure chamber 26 in combination with heating of the metal bursting diaphragm 24 causes the diaphragm to burst. As a result, the steam pressure drops, and the check flap 25 can open into an opening position 25a in response to the pressure of the water column of the coolant 6 resting on it.

Figure 5:
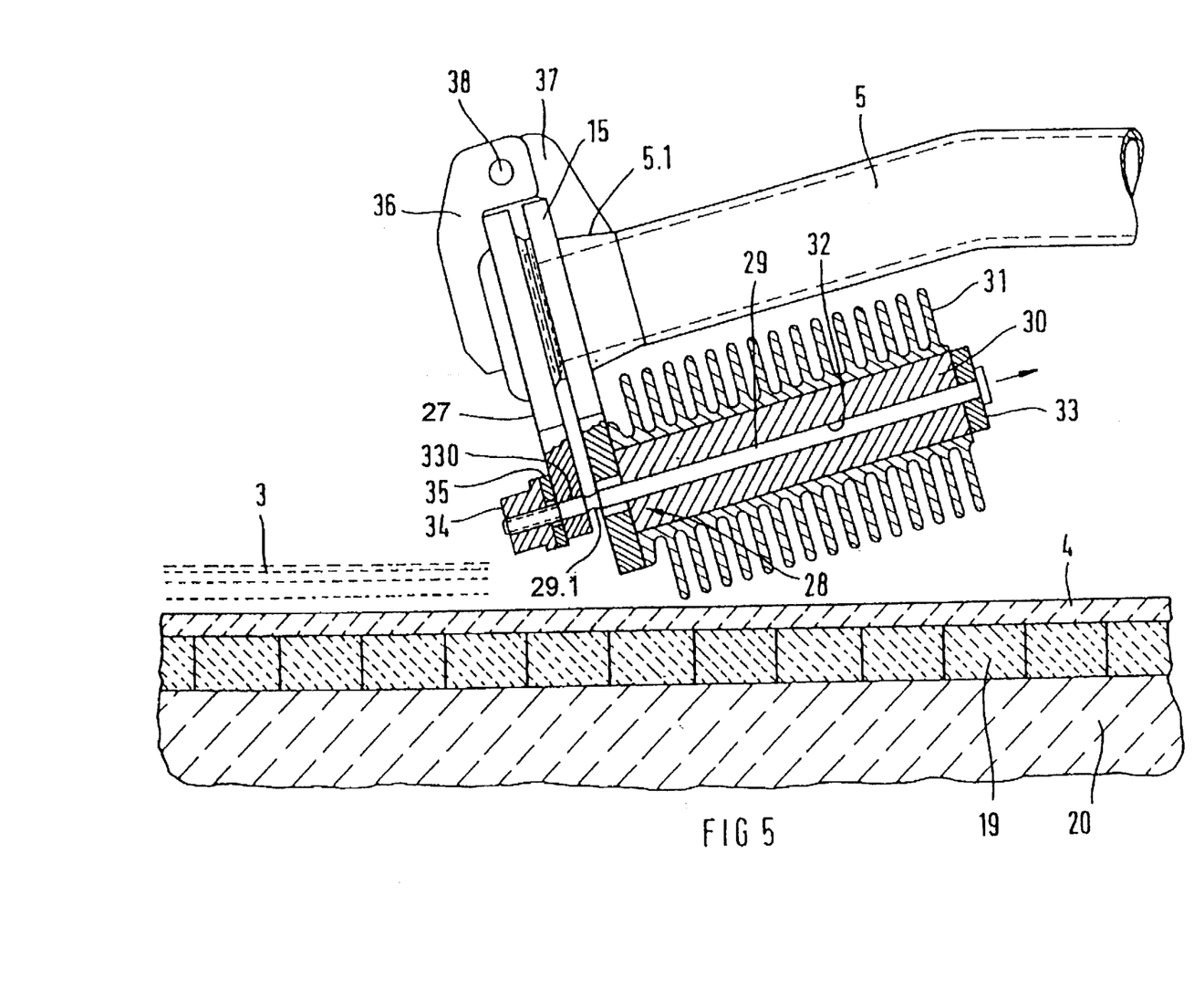
FIG. 5 is a view similar to FIGS. 1 and 2 of a closing device having a sealing flap configuration on the outlet end of the connecting line and an expansion bolt with a rated breaking point, which keeps the sealing flap half in its sealing position and with which a thermal expansion cartridge with heating ribs is associated.

In the exemplary embodiment of FIG. 5, a sealing flap 27 on the outlet end 5.1 of the connecting line 5 is kept in its closing position by an expansion bolt fastener 28. An expansion bolt 29 is surrounded by a thermal expansion cartridge 30, which in turn receives a strong flow of heat from the core melt 3 through heating ribs 31. The expansion bolt 29 has a rated breaking or tearing point 29.1, which responds when a bolt breaking temperature of 700° C., for instance, is reached. The expansion bolt 29 passes through the thermal expansion cartridge 30 in a central channel 32. The expansion bolt 29 engages an anchor plate 33 from behind on one end surface of the expansion cartridge 30 and is braced, as it passes through the flap 27 in an opening 330, by a bolt nut 34 with a shim 35. This is done in such a way that the sealing flap 27 is pressed by an encompassing sealing edge against a corresponding encompassing sealing surface on the pipe flange 15. The sealing flap 27 is hinged at a hinge point 38 so as to be opened and closed with a bail 36 on a tab 37 that is permanently connected to the pipe flange 15. The thermal expansion cartridge 30 has a substantially higher thermal expansion coefficient than the expansion bolt 29, so that whenever a given differential expansion for the expansion bolt 29 occurs as a result of the heating, it breaks off at the point 29.1. The sealing flap 27 then opens, and the way is cleared for the coolant.

Figure 6:
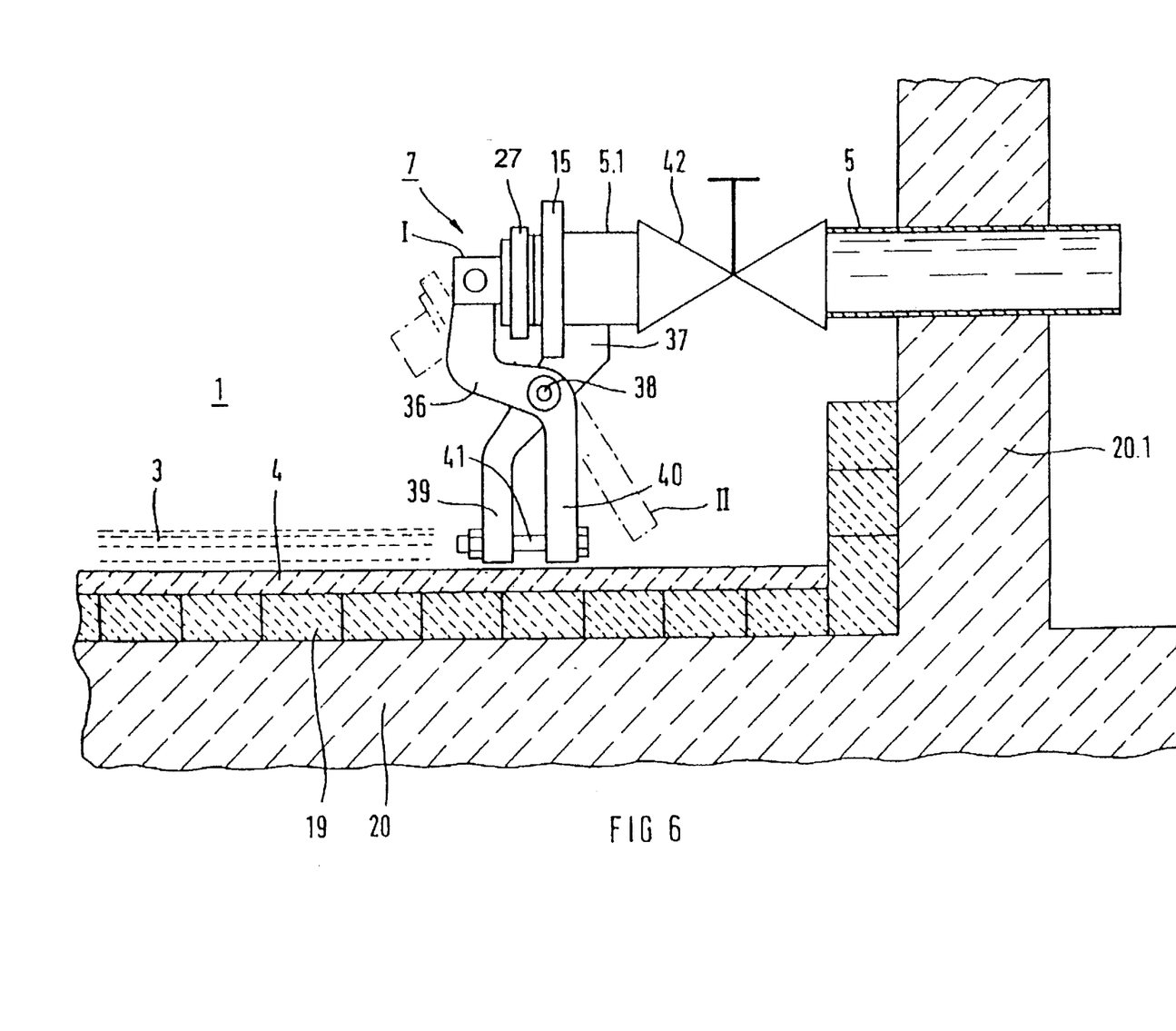
FIG. 6 is a view similar to FIGS. 1 and 2 of a closing device, again with a sealing flap, having halves which are kept in their sealing position by a fusible bolt.

In the exemplary embodiment of FIG. 6, the sealing configuration of the closing member 7 includes a sealing flap 27. A fixed flap seat on the pipe flange 15 and the sealing flap 27 are constructed with tong-like arms 39, 40, which protrude past a flap hinge 38 and are kept spaced apart in a sealing position of the sealing flap 27 by a fusible screw 41. The fusible screw 41 is disposed, as shown, in a lower region of the collecting chamber 1 and is destroyed when the core melt 3 reaches it. The arm 40 with the sealing flap 27 is then swiveled out of its closing position I into its opening position II, which is shown in phantom. The fusible bolt or fusible screw 41 may be a bolt or screw made of silver. A diagrammatically suggested shutoff or slide valve 42 is expediently disposed in the connecting line 5. The valve 42 is open during normal operation.

Figure 7:
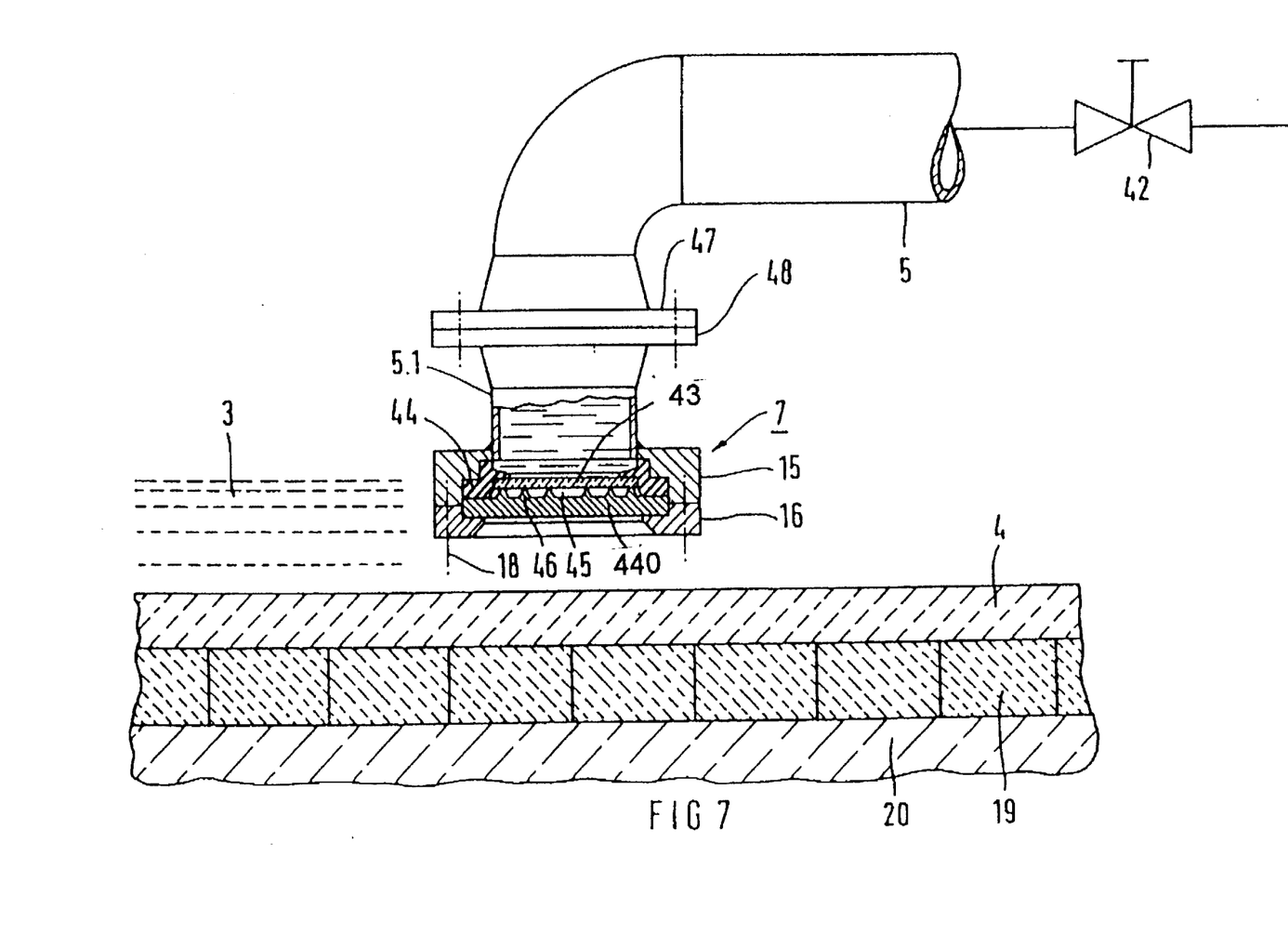
FIG. 7 is a view similar to FIGS. 1 and 2 of a closing device with a glass plate as the bursting element, being fastened in place by a rubber cuff and retained in the sealing position by a thermal bursting disk which is likewise made of glass.

In the exemplary embodiment of FIG. 7, a glass plate 43, preferably being formed of normal glass, is fastened in place by a rubber cuff seam 44. A thermal bursting disk 440 is sealingly fastened, in both a bracing and at the same time a cold-insulating relationship, against the glass plate 43 through the use of the pipe flange 15 and the counterflange 16. An insulating air layer 45 is located between the glass plate 43 and the thermal bursting disk 440. In order to keep cold bridges as small as possible, the thermal bursting disk 440 is provided with relief-like protuberances, especially annular protuberances 46, with which it rests on the glass plate 43. Under an appropriate temperature stress, the thermal bursting disk 440 shatters and falls out downward. This eliminates the supporting action for the glass plate 43, which is forced out of its sealing cuff 44 toward the bottom by the static water pressure of the water column 6. The closing member 7 is constructed as a structural unit that can be flanged to an intermediate flange 47 of the connecting line 5 through the use of a counterflange 48. A shutoff or slide valve is again diagrammatically shown at reference numeral 42.

Figure 8:
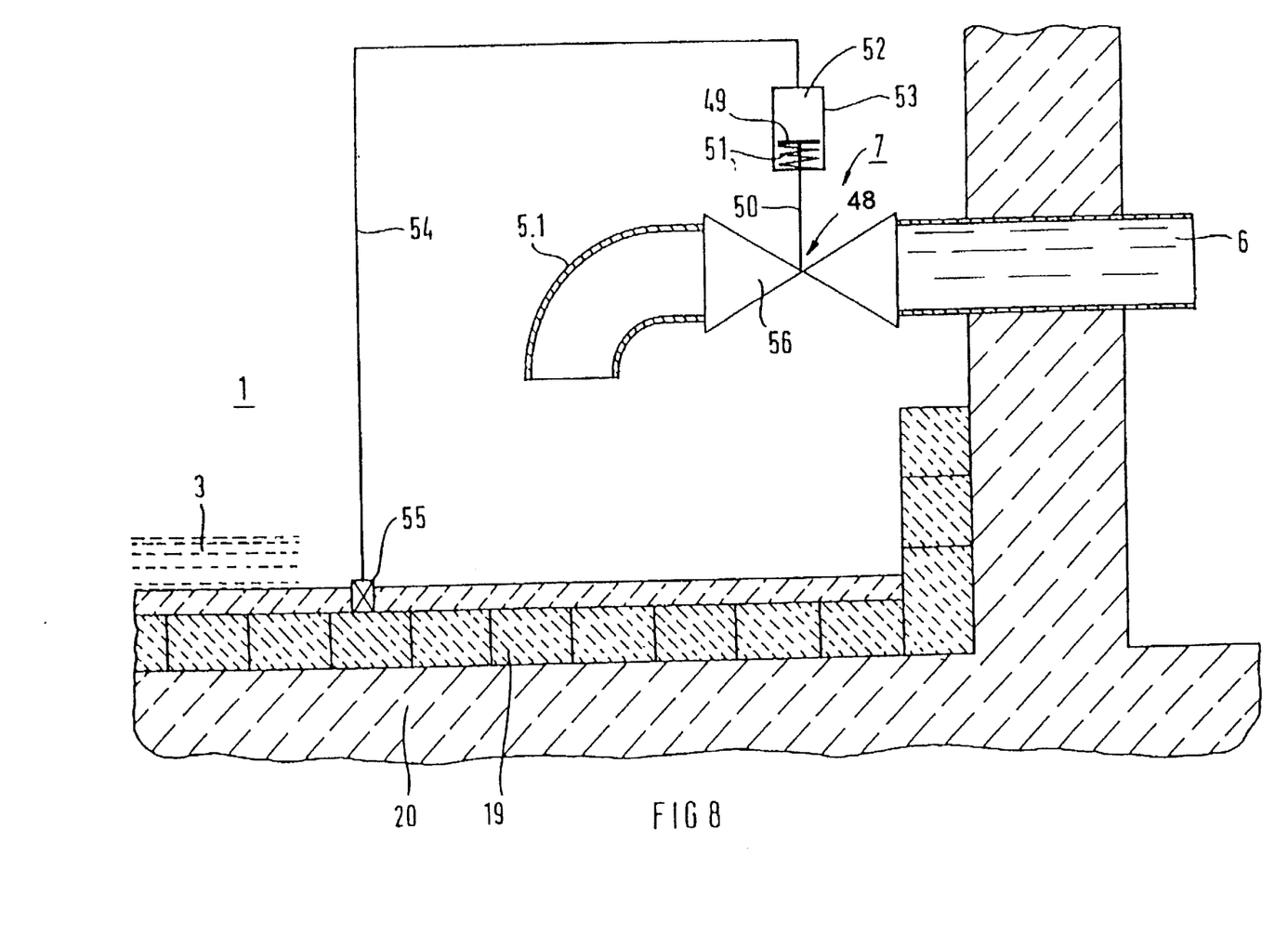
FIG. 8 is a view similar to FIGS. 1 and 2 of a closing device, with an opening valve having a valve opening with a spring engaging one side of a piston that is normally tensed counter to the pressure prevailing on the other side of the piston, and having a meltable sensor element on the bottom of the collecting chamber for reducing pressure in the event of a malfunction.
Figure 9:
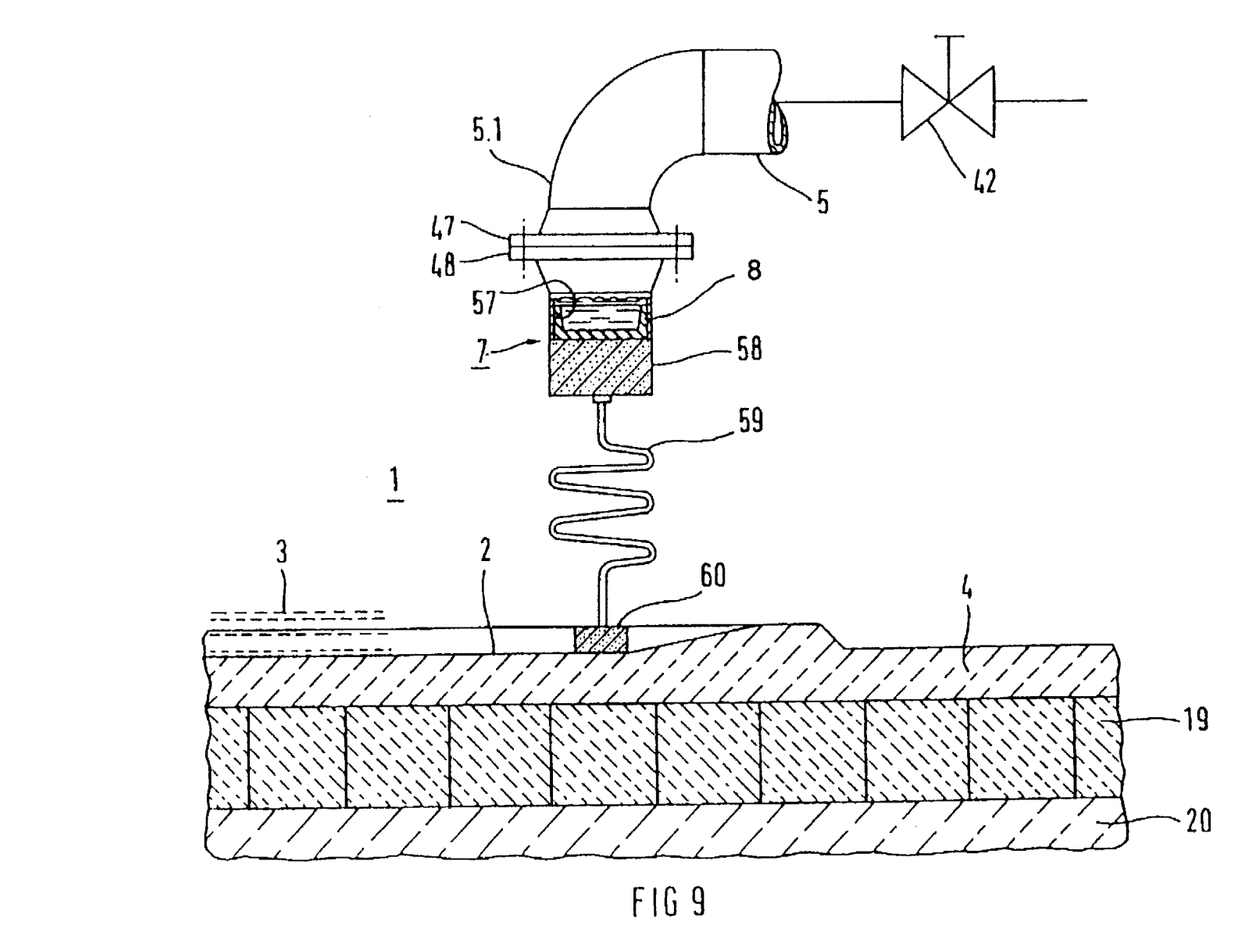
FIG. 9 is a view similar to FIGS. 1 and 2 of a closing device, in which a self-sealing cuff acting as the sealing element normally closes the orifice of the connecting line and is kept in its sealing position by a thermite fusible or melt packing, which is made to melt down in the event of a core meltdown.

In the closing devices of FIGS. 8 and 9, a sealing element can be shifted into its opening position through the use of stored auxiliary energy. A discharge or dissipation of the auxiliary energy for opening the closing member 7 can be tripped by the thermal action of the core melt 3. In FIG. 8, the closing member is a safety valve 56 having a closing piece 48 which is coupled to a control piston 49 through a piston rod 50. One side of the piston 49 is engaged by the force of a taut valve opening spring 51, and a counterforce resulting from a fluidic control pressure inside a chamber 52 of a cylinder 53 bears on the other side of the piston. The fluidic defined control pressure keeps the closing piece of the valve in its closing position. A self-contained fluidic control line system 54 for the control pressure includes at least one sensor body 55 disposed in a bottom region of the collecting chamber 1. The sensor body 55 opens under the influence of the heat of the core melt 3, for instance at an intended melting location, and thus decreases the control pressure. The safety valve 56 opens and thus clears the way for the coolant 6 which follows a course past the outlet end 5.1 that is constructed as a pipe bend pointing downward, to the surface of the core melt 3. The control pressure system 54 may also be provided with a remote pressure monitor, which can serve to indicate leaks and to indicate proper opening.

In the closing device of FIG. 9, a sealing element 8 is a cuff, which is self-sealing under water pressure, which conforms to an inner periphery of an orifice 57 of the connecting line 5 or its outlet end 5.1, and which is held in its illustrated sealing position by a thermite melt packing 58 secured to the orifice 57 of the connecting line 5. An ignition cord 59 is laid from an igniter 60 which is disposed in a bottom region of the collecting chamber 1 at the expansion surface 2, to the thermite melt packing 58 that is disposed at a distance above the igniter 60. Therefore, after ignition of the igniter 60 by the heat of the core melt and destruction of the thermite melt packing 58 which is tripped thereby, the cuff 8 is forced out by the water pressure prevailing in the orifice region 57 of the connecting line 5.

Figure 10:
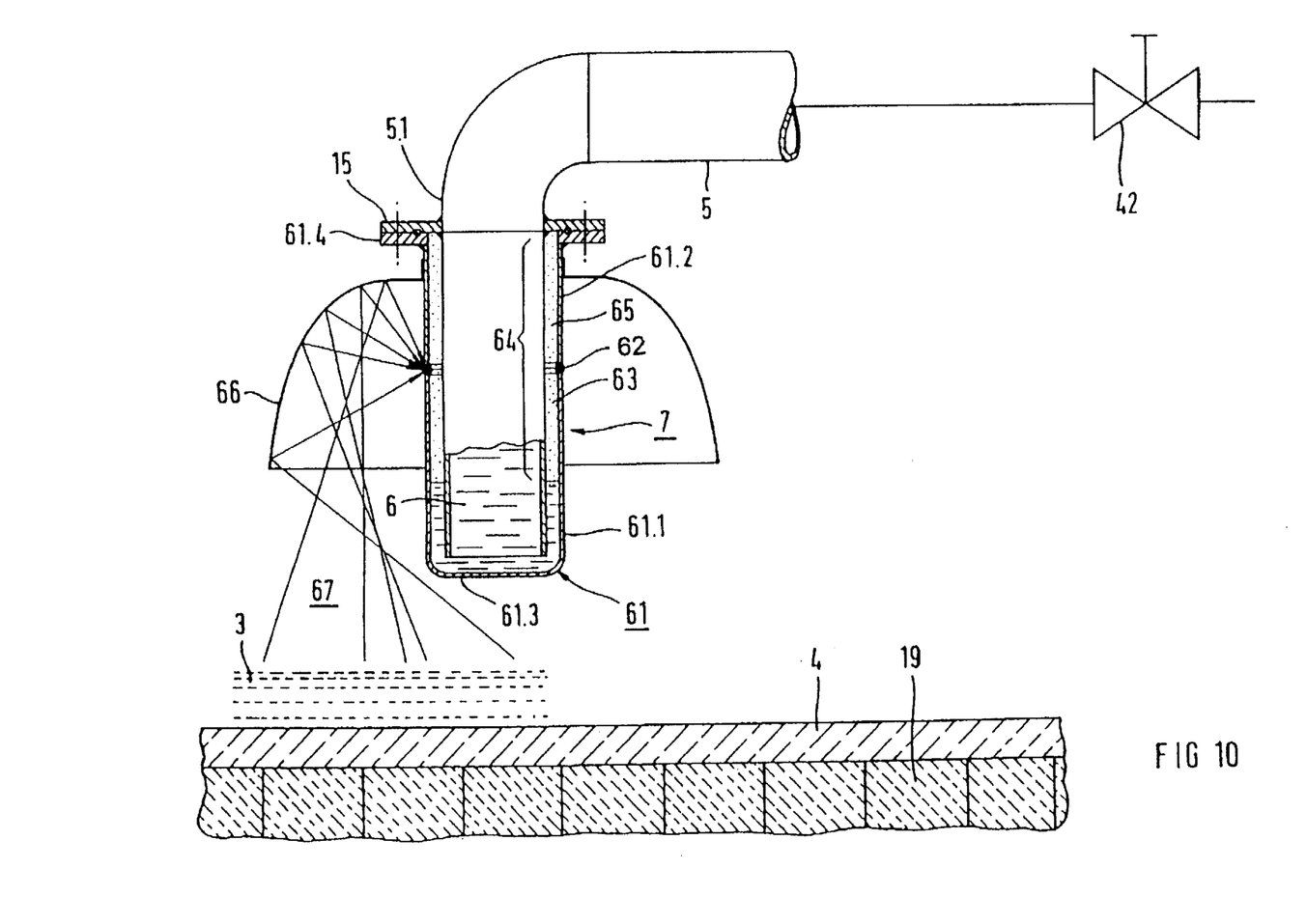
FIG. 10 is a view similar to FIGS. 1 and 2 of a closing device having a hood-like closing member and an annular gap provided between the orifice tube and a hood, wherein the gap is provided with an air cushion in the vicinity of a surrounding fusible solder connection.
Figure 11:
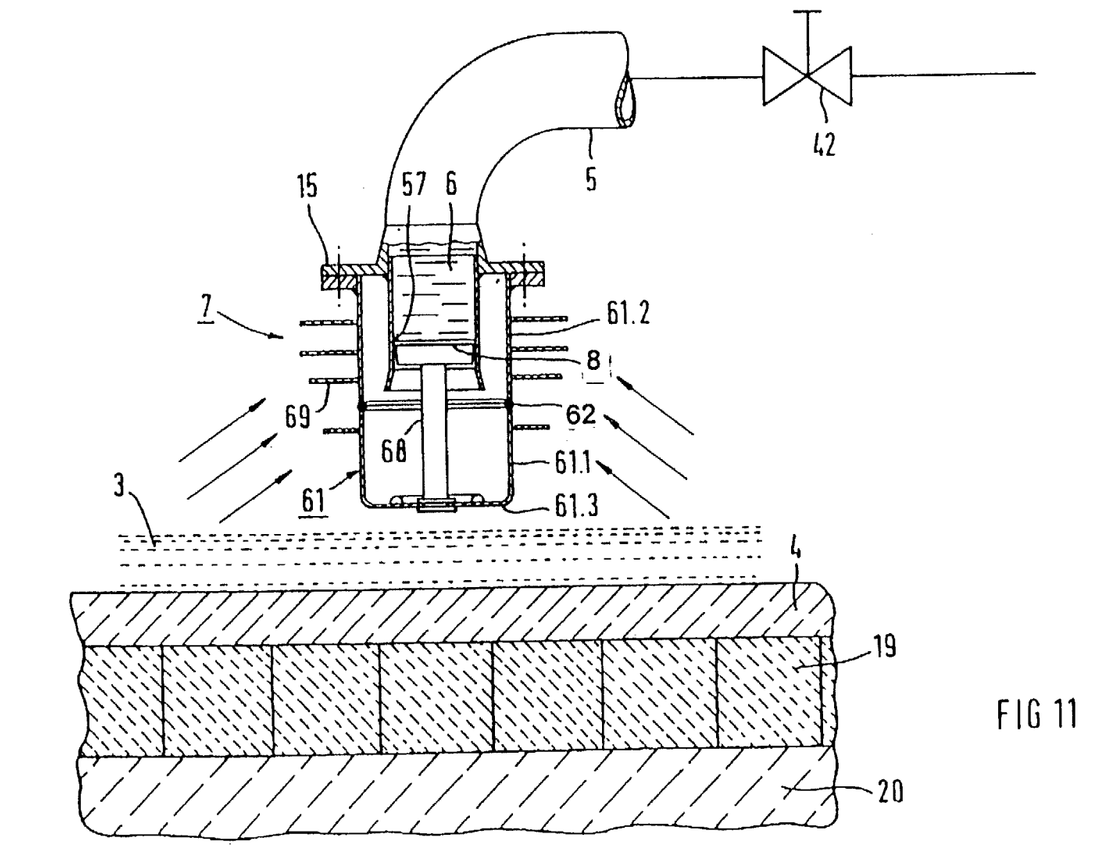
FIG. 11 is a view similar to FIGS. 1 and 2 of a closing device, again with a hood-like closing member and a surrounding fusible solder connection thereon, but in which the cooling water is kept away from the interior of the hood by a cuff seal anchored to the end wall of the hood.
Figure 12:
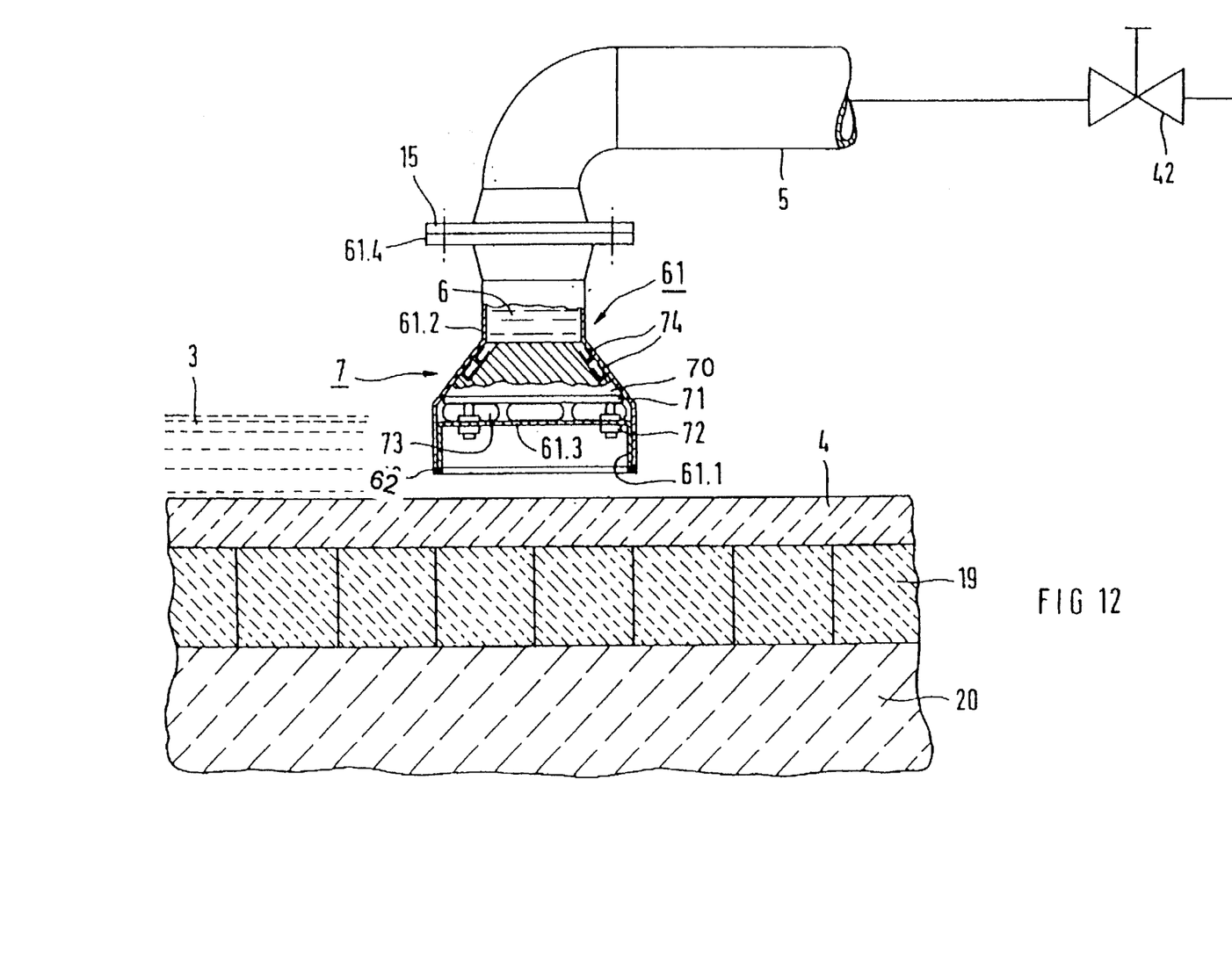
FIG. 12 is a view similar to FIGS. 1 and 2 of a closing device with an outer hood part folded over inward with an encompassing fusible solder connection between the inner and outer hood parts and with a non-self-locking sealing cone for closing the tube orifice of the connecting line, in which the sealing cone is kept in its sealing position by the outer hood part.

The closing devices of FIGS. 10–12 are provided with hood-like closing members, which are divided into outer and inner hood parts 61.1 and 61.2 by surrounding fusible solder connections 62. The coolant is kept away from the surrounding fusible solder connections 62, in order to ensure that fast, reliable melting under the influence of the heat of the core melt 3 will occur.

Referring to FIG. 10 in detail, it is seen that a hood-like closing member 61 has an annular flange 61.4 with which it is sealingly flanged to the pipe flange 15 of the connecting line 5. The hood-like closing member 61 surrounds the tube end or outlet end 5.1 which extends past the pipe flange 15 or is elongated, defining an annular gap 63 therebetween. The annular gap 63 extends from the annular flange 61.4 to a base 61.3 of the hood-like closing member 61. The annular gap 63, which is sealed off from the outside, communicates with the water column in the connecting line 5 and is provided over a portion 64 of its length with an air cushion chamber 65 adjoining the water column. The fusible solder connection 62 is then disposed within this air cushion chamber 65 and is thus protected against direct cooling by the coolant 6. It is advantageous to surround the hood-like closing member 61 with a shield-like thermal radiation reflector 66, having a focal point zone in which the fusible solder connection 62 is located. Reference numeral 67 indicates the thermal radiation originating at the core melt 3, which is concentrated on the fusible solder connection 62. Therefore, besides heat transfer through the use of convection, heat transfer by radiation occurs above all. This leads to rapid melting open of the fusible solder connection 62 and thus to the separation of the outer hood part 61.1.

In the closing device of FIG. 11, a sealing element 8, in the form of a sealing cuff, that seals off the orifice 57 of the connecting line 5 is held by the outer hood part 61.1 in such a way that the outer hood part 61.1 and the inner hood part 61.2 as well as the fusible solder connection 62 between the two are normally water-free. The sealing element 8 is held by a central shaft 68, which in turn is anchored in the lower hood base 61.3 of the outer hood part 61.1. The outer periphery of the hood-like closing member 61 is provided with heating ribs 69, so that the strongest possible heat flux to the fusible solder connection 62 will occur if a core melt 3 spreads out. Alternatively, the heat radiation reflector 66 of FIG. 10 could also be used. When the fusible solder connection 62 melts open, the sealing cuff 8 can no longer be retained on its central shaft 68. Therefore, the water pressure inside the orifice 57 of the connecting line 5 (approximately 0.3 bar) forces the sealing cuff 8 out, and the coolant pours onto the surface of the core melt 3.

In the closing device of FIG. 12, the closing member 7 includes a non-self-locking sealing cone 70, which closes a conically widening outer end of the inner hood part 61.2. The sealing cone 70 is held in its sealing seat through a clamping plate 71 and is held thereon by holding-down screws 72 acting from outside. The holding-down screws 72 are retained in the base 61.3 of the outer hood part 61.1, which is joined to the inner hood part 61.2 through the use of a surrounding fusible solder connection 62. In order to ensure uniform transfer of the sealing pressure to the clamping plate 71 and thus to the sealing cone 70, elastically deformable bodies 73 such as rubber pillows or rubber cushions, are provided. One or more U-shaped sealing cuffs 74 are also inserted between the sealing cone 70 and the conically widening counterpart sealing surface. When the encompassing ring of fusible solder 62 melts open, since the outer hood part 61.1 is then no longer held, it is thrust outward by the pressure of the water, together with its holding-down screws 72, the bodies 73, the clamping plate 71 and the sealing cone 70, and it is melted open by the core melt 3. The water 6 thus pours over the surface of the core melt 3, since the great majority of the inner hood part 61.2 (which is not directly in contact with the coolant) has melted away as well.

We claim:

1. In a nuclear reactor facility having a collecting chamber for a core melt, a coolant tank and a coolant connecting line having an inlet end connected to the coolant tank and an outlet end protruding into the collecting chamber and having an outlet cross section, a closing device at the connecting line opening as a function of temperature for initiating cooling of the core melt, comprising:

a closing member disposed at the outlet end of the connecting line for normally tightly closing the outlet end;

said closing member having a temperature-dependent opening element for tripping clearance of at least a portion of the outlet cross section of the connecting line upon thermal action by the core melt to direct the coolant from the coolant tank, through the connecting line and into the collecting chamber; and said opening element being a plastic block which is thermally insulating the coolant, and is corrision-resistant.

2. The closing device according to claim 1, including a pipe flange on the outlet end of the connecting line, and wherein said plastic block has a sealing flange being sealingly held against said pipe flange.

3. The closing device according to claim 2, wherein said plastic block has an end surface facing away from said sealing flange, and including at least one tension element being anchored to said pipe flange for holding said plastic block in a sealing position, and a pressure device engaging said end surface and being engaged by said tension element.

4. The closing device according to claim 3, including a flange ring, said tension element being a steel box having one end being joined to said flange ring and being fastened by said flange ring to said pipe flange of the connecting line, and said tension element having another end being joined to said pressure device.

5. The closing device according to claim 1, wherein the coolant tank is a cooling water tank.

* * * * *